(12) United States Patent
Huang et al.

(10) Patent No.: US 8,859,044 B2
(45) Date of Patent: Oct. 14, 2014

(54) METHOD OF PREPARING GRAPHENE LAYER

(75) Inventors: Kun-Ping Huang, Miaoli County (TW);
Chih-Chen Chang, New Taipei (TW);
Yu-Tse Hsieh, Taoyuan County (TW);
Po-Wen Chiu, Hsinchu (TW); Henry Medina, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 26 days.

(21) Appl. No.: 13/613,755

(22) Filed: Sep. 13, 2012

(65) Prior Publication Data

US 2013/0168229 A1 Jul. 4, 2013

(30) Foreign Application Priority Data

Dec. 30, 2011 (TW) .............................. 100149777 A

(51) Int. Cl.
*C23C 16/26* (2006.01)
*C23C 16/48* (2006.01)

(52) U.S. Cl.
USPC ........................................ 427/249.1; 427/575

(58) Field of Classification Search
CPC ........ C23C 16/26; C23C 16/511; C23C 4/00; H01J 37/32678; C30B 25/105; C01B 31/04; C01B 31/0021; B82Y 10/40; B82Y 10/10; B82Y 10/30
USPC .............................................. 427/575, 249.1
See application file for complete search history.

(56) References Cited

U.S. PATENT DOCUMENTS

| 4,973,494 | A | * | 11/1990 | Yamazaki ..................... 427/571 |
| 6,250,984 | B1 | | 6/2001 | Jin et al. |
| 6,630,722 | B1 | | 10/2003 | Aoki |
| 6,787,200 | B1 | * | 9/2004 | Delaunay et al. ............. 427/571 |
| 7,303,790 | B2 | | 12/2007 | Delaunay et al. |
| 7,903,338 | B1 | | 3/2011 | Wach |
| 2001/0031900 | A1 | * | 10/2001 | Margrave et al. ............. 570/126 |
| 2004/0011291 | A1 | * | 1/2004 | Delaunay et al. ..... 118/723 MA |
| 2004/0035355 | A1 | * | 2/2004 | Avouris et al. ................. 117/40 |
| 2009/0068740 | A1 | * | 3/2009 | Mizuno .......................... 435/401 |
| 2009/0324897 | A1 | * | 12/2009 | Choi et al. ................. 428/195.1 |

(Continued)

FOREIGN PATENT DOCUMENTS

| TW | 201100324 A | 1/2011 |
| TW | 201204183 A1 | 1/2012 |
| TW | 201230886 A1 | 7/2012 |

OTHER PUBLICATIONS

Taiwanese Office Action for Taiwanese Application No. 100149777, issued Sep. 17, 2013.

(Continued)

*Primary Examiner* — Joseph Miller, Jr.
(74) *Attorney, Agent, or Firm* — Birch, Stewart, Kolasch & Birch, LLP

(57) ABSTRACT

Disclosed is a method of forming a graphene layer, including: putting a substrate in a chamber of an electron cyclotron resonance device, and then evacuating the chamber. Conducting a carbon-containing gas into the chamber, wherein the carbon-containing gas has a pressure of $10^{-2}$ torr to $10^{-4}$ torr in the chamber. Heating the substrate until the substrate has a temperature of 100° C. to 600° C., and using a microwave with an electron cyclotron resonance mechanism to excite the carbon-containing gas to deposit a graphene layer on the substrate.

11 Claims, 2 Drawing Sheets

(56) References Cited

U.S. PATENT DOCUMENTS

| | | |
|---|---|---|
| 2010/0021708 A1 | 1/2010 | Kong et al. |
| 2010/0255219 A1 | 10/2010 | Wenxu et al. |
| 2010/0301212 A1 | 12/2010 | Dato et al. |
| 2010/0323113 A1 | 12/2010 | Ramappa et al. |
| 2012/0177542 A1 | 7/2012 | Chang et al. |

OTHER PUBLICATIONS

Bae et al., "Roll-to-roll production of 30-inch graphene films for transparent electrodes", Nature Nanotechnology, vol. 5, pp. 574-578, Jun. 20, 2010.

Dang et al., "Epitaxial Heterostructures of Ultrathin Topological Insulator Nanoplate and Graphene", Nano Letters, vol. 10, pp. 2870-2876, 2010.

Dato et al., "Substrate-Free Gas-Phase Synthesis of Graphene Sheets", Nano Letters, vol. 8, No. 7, pp. 2012-2016, 2008.

Fan et al., "Multi-functional ECR plasma sputtering system for preparing amorphous carbon and Al—O—Si films", Surface & Coatings Technology, vol. 206, pp. 1963-1970, 2011.

Kawai et al., "Production of Large Diameter ECR Plasma", J. Phys IV France, vol. 7, pp. C4-235-C4-246, 1997.

Kim et al., "Low-temperature synthesis of large-area graphene-base transparent conductive films using surface wave plasma chemical vapor deposition", AIP Applied Physics Letters, vol. 98, pp. 091502-1-091502-3, 2011.

Nakayama, "ECR (electron cyclotron resonance) plasma for thin film technology", Pure & Appl. Chem., vol. 62, No. 9, pp. 1751-1756, 1990.

Nandamuri et al, "Remote plasma assisted growth of graphene films", Applied Physics Letters, vol. 96, pp. 154101-1-154101-3, 2010.

Chinese Office Action, dated May 20, 2014, for Chinese Application No. 201210264979.4.

\* cited by examiner

METHOD OF PREPARING GRAPHENE LAYER

CROSS REFERENCE TO RELATED APPLICATIONS

The present application is based on, and claims priority from, Taiwan Application Serial Number 100149777, filed on Dec. 30, 2011, the disclosure of which is hereby incorporated by reference herein in its entirety

TECHNICAL FIELD

The technical field relates to a method of forming a graphene layer, and in particular relates to a method of forming a graphene layer utilizing an electron cyclotron resonance device.

BACKGROUND

In 2004, A. K. Geim et al. of the University of Manchester discloses a graphene layer transferred from a highly orientated pyrolytic graphite to a silica substrate by mechanical exfoliation. The graphene layer, having a thickness of an atom, is an actual single-layered graphite. Not only overcomes the law of thermodynamics, the method also provides a way to prepare a graphene layer. However, the method has two major disadvantages: the graphene layer positions are found by human effort with a lot of time, and the graphene connected to graphite (with a quite thickness) has too small of an area to be applied in the semiconductor industry.

In recent years, other methods of preparing the graphene layer have been developed, such as pyrolysis epitaxial growing a graphene layer on silicon carbide, oxidation-reduction, chemical vapor deposition, and the likes. Those methods only form a graphene layer with a small area on a substrate of a specific material. Transferring the graphene layer from the growth substrate to another substrate needs different solvents, catalyst, or ultra high temperature pyrolysis. In other words, the transfer process is expensive and time-consuming.

Accordingly, a novel method of forming a graphene having a large area on a substrate of any material is called-for.

SUMMARY

One embodiment of the disclosure provides a method of forming a graphene layer, comprising: putting a substrate in a chamber of an electron cyclotron resonance device, and evacuating the chamber; conducting a carbon-containing gas into the chamber, wherein the carbon-containing gas has a pressure of $10^{-2}$ torr to $10^{-4}$ torr in the chamber; heating the substrate until the substrate has a temperature of 100° C. to 700° C.; and using a microwave with an electron cyclotron resonance mechanism to excite the carbon-containing gas to deposit a graphene layer on the substrate.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1A:
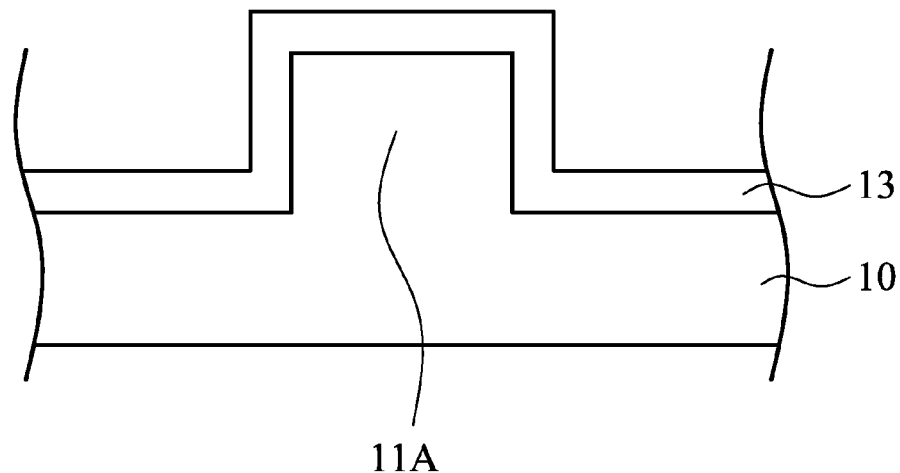
FIGS. 1A and 1B show a deposited graphene layer on a substrate having a protrusion in one embodiment of the disclosure.
Figure 1B:
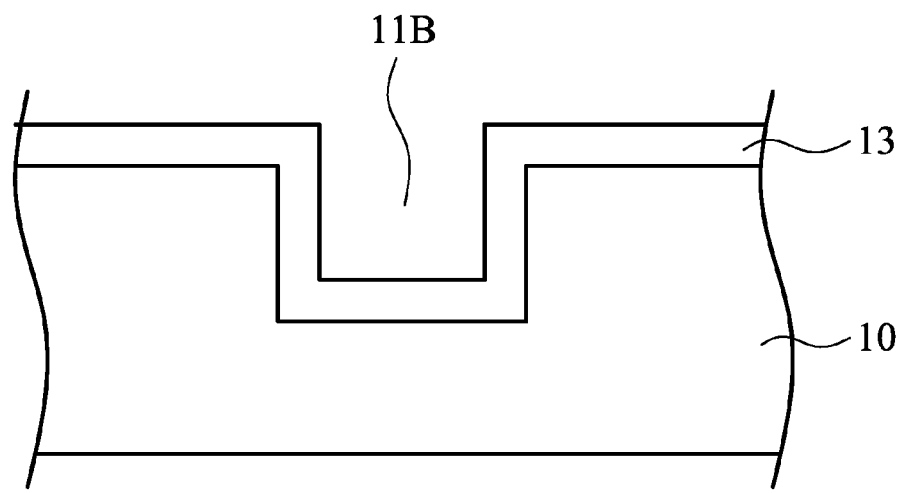

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the disclosure, factors of an electron cyclotron resonance device are tuned to form a graphene layer having a large area on a substrate of an arbitrary material. First, the substrate is put into a chamber of the electron cyclotron resonance device. For a suitable electron cyclotron resonance device, reference may be made to, but is not limited to, ECR (electron cyclotron resonance) plasma for thin film technology, *Pure & Appl Chem*, Vol. 62, No. 9, p. 1751-1'756, 1990, Production of Large Diameter ECR Plasma, *J. PHYS IV FRANCE* 7, Colloque C4, p. 235-246, 1997, or Multi-functional ECR plasma sputtering system for preparing amorphous carbon and Al—O—Si films, *Surface & Coating Technology*, Vol. 206, p. 1963-1970, 2011. A suitable substrate material can be, for example, metal (e.g. aluminum or copper), compound (e.g. silicon carbide), or non-metal (e.g. glass or plastic) if necessary. In addition, the substrate may have a flat surface, or a protrusion or a concave on its surface. In one embodiment, the substrate surface may have a film thereon to help form the graphene layer. The film can be a dielectric layer, a semiconductor layer, or a metal layer. In one embodiment, a silicon carbide film is disposed on the substrate surface.

In one embodiment, the electron cyclotron resonance device is an electron cyclotron resonance device having a single microwave source disclosed by the inventor of this application (See Taiwan Application No. 99121856), or an electron cyclotron resonance device having multi-microwave sources disclosed by the inventor of this application (See Taiwan Application No. 100101138). When the number of the microwave sources is more, the substrate and the graphene layer thereon have a larger area. For example, the electron cyclotron resonance device having a single microwave source can only deposit a graphene layer with an area of 1 cm×1 cm to 30 cm×30 cm on the substrate, and the electron cyclotron resonance device having the multi-microwave sources can deposit a graphene layer with an area of 1 cm×1 cm to 300 cm×300 cm on the substrate. The electron cyclotron resonance device includes a tunable electromagnet or a permanent magnet to provide a magnetic field of 875 Gauss for the electron cyclotron resonance phenomenon.

After the substrate is put into a chamber of the electron cyclotron resonance device, the chamber is evacuated. In one embodiment, the chamber is evacuated to have a pressure of $10^{-6}$ torr to $10^{-8}$ torr. An overly high chamber pressure will degrade a subsequently deposited film due to too much residue gas remaining in the chamber. An overly low chamber pressure takes too much time in the evacuating step while not improving upon following processes.

A carbon-containing gas is then conducted into the chamber, and the carbon-containing gas has a pressure of $10^{-2}$ torr to $10^{-4}$ torr in the chamber. The carbon-containing gas serves as a carbon source of the graphene layer. The carbon-containing gas can be a hydrocarbon compound such as methane, ethene, ethyne, or combinations thereof. An overly high pressure of the carbon-containing gas may cause an overly fast deposition, thereby forming a multi-layered graphene layer or a few-layered graphene layer. An overly low carbon-containing gas may cause unstable plasma and reduce the quality of deposited film.

The substrate is then heated to a temperature of 100° C. to 700° C. A graphene layer cannot be deposited on a glass substrate with an overly high substrate temperature. A graphene layer with a large area cannot be deposited on a glass substrate with an overly low substrate temperature. In one embodiment, the substrate temperature can be lower than 400° C. to utilize a glass substrate, a plastic substrate, or other low temperature substrate.

Subsequently, the carbon-containing gas is excited by the single microwave source or the multi-microwave sources to form a carbon-containing plasma. It should be understood that a substrate with a larger area (equal to the deposited graphene layer with a larger area) needs a higher power microwave. If the single microwave source cannot provide an ultra high power microwave, the multi-microwave sources can be adopted. Each source of the multi-microwave sources may provide a high power microwave, respectively, and the high power microwaves from different sources are simulated to the ultra high power microwave for large area deposition. Finally, the graphene with a large area is deposited on the substrate by the carbon-containing plasma. The carbon-containing plasma has a density of $10^{10}$ ions/cm$^3$ to $10^{12}$ ions/cm$^3$.

In another embodiment, an inert gas and hydrogen can be further conducted into the chamber before, during, or after the step of depositing the graphene layer on the substrate. The inert gas and the hydrogen will be excited by the microwave to form an inert gas plasma and a hydrogen plasma, respectively. The inert gas can be argon, helium, or combinations thereof. The inert gas has a pressure of $10^{-2}$ torr to $10^{-4}$ torr in the chamber, and the hydrogen has a pressure of $10^{-2}$ torr to $10^{-4}$ torr in the chamber. The inert gas and hydrogen conducted into the chamber before the step of depositing the graphene layer on the substrate may clean the substrate surface and/or chemically reduce the substrate surface. The inert gas and hydrogen conducted into the chamber during the step of depositing the graphene layer on the substrate may avoid an impure phase or amorphous carbon from being formed on the graphene layer surface. The inert gas and hydrogen conducted into the chamber after the step of depositing the graphene layer on the substrate may modify the graphene layer to reduce its electrical resistance.

Figure 2A:
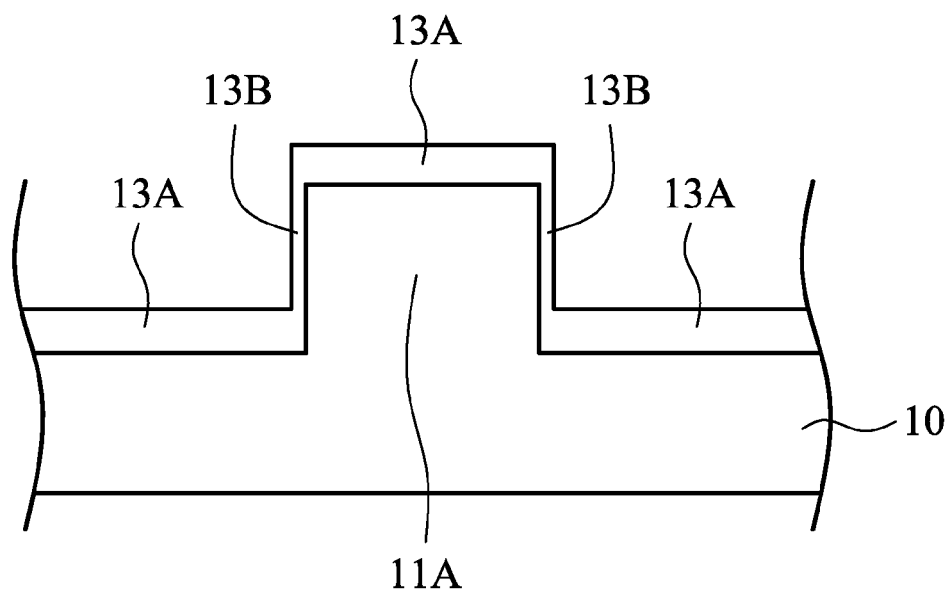
FIGS. 2A and 2B show a deposited graphene layer on a substrate having a cavity in one embodiment of the disclosure.
Figure 2B:
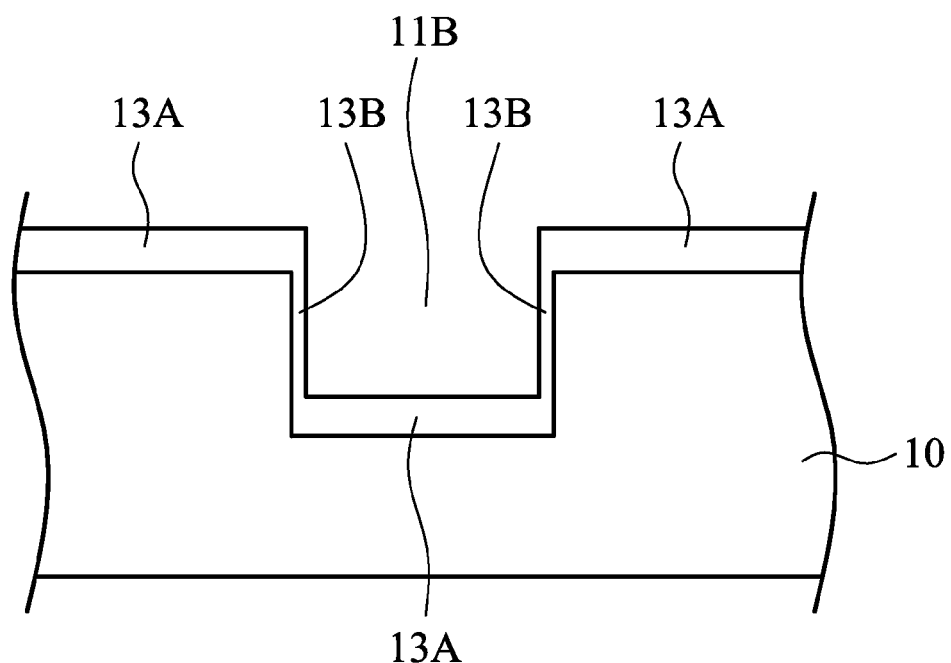

As shown in FIG. 1A (or 1B), the substrate 10 has a protrusion 11A (or a cavity 11B), the described processes may deposit a graphene layer conformally on the substrate 10. In one embodiment, the graphene layer on the surface of the substrate 10 and a top of the protrusion 11A (or a bottom of the cavity 11B) is slightly thicker than or equal to that on a sidewall of the protrusion 11A (or a sidewall of the cavity 11B). In another embodiment, a bias voltage greater than 50V is simultaneously applied to the substrate 10 when the graphene layer is deposited on the substrate 10. As shown in FIGS. 2A and 2B, the graphene layer 13A on the surface of the substrate 10 and the top of the protrusion 11A (or the bottom of the cavity 11B) has a same thickness, which is largely thicker than the graphene layer 13B on the sidewall of the protrusion 11A (or the sidewall of the cavity 11B)

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout

EXAMPLES

Example 1

A SiO$_2$ substrate with an area of 2 cm×2 cm was put into a chamber of an electron cyclotron resonance device of Taiwan Application No. 99121856. The chamber was evacuated to a pressure of 5×10$^{-6}$ torr, and ethyne, argon, and hydrogen were then conducted into the chamber until the pressure of the chamber reached 0.00075 torr. The substrate was then heated to 400° C., and a microwave of 1500 W was applied to excite the ethyne to form an ethyne plasma. As a result, a graphene layer with an area of 2 cm×2 cm was deposited on the SiO$_2$ substrate. The deposition process was performed for 5 minutes. The graphene layer was electrically tested to measure its sheet resistance (about 40kΩ/□). In a Raman spectroscopy of the graphene layer, the graphene layer had an obvious characteristic peak of 2650 cm$^{-1}$, and the graphene characteristic peak and a graphite characteristic peak (~1570 cm$^{-1}$) had an intensity ratio of about 0.1.

Example 2-1

Similar to Example 1, the only difference in Example 2-1 was the substrate being a quartz substrate with an area of 2 cm×2 cm (commercially available from Shih-Chuan Technology Company, Taiwan). The deposited graphene layer with an area of 2 cm×2 cm was electrically tested to measure its sheet resistance (about 20 kΩ/□). In a Raman spectroscopy of the graphene layer, the graphene layer had an obvious characteristic peak of 2650 cm$^{-1}$, and the graphene characteristic peak and a graphite characteristic peak (~1570 cm$^{-1}$) had an intensity ratio of about 0.15.

Example 2-2

Similar to Example 1, the only difference in Example 2-2 was the substrate being a glass substrate with an area of 2 cm×2 cm (Eagle2000, commercially available from Corning incorporated, Taiwan). The deposited graphene layer with an area of 2 cm×2 cm was electrically tested to measure its sheet resistance (about 30 kΩ/□). In a Raman spectroscopy of the graphene layer, the graphene layer had an obvious characteristic peak of 2650 cm$^{-1}$, and the graphene characteristic peak and a graphite characteristic peak (~1570 cm$^{-1}$) had an intensity ratio of about 0.13.

Example 2-3

Similar to Example 1, the only difference in Example 2-3 was the substrate being a pure copper substrate with an area of 2 cm×2 cm (commercially available from Nilaco Corporation, Japan). The deposited graphene layer with an area of 2 cm×2 cm was electrically tested to measure its sheet resistance (about 8 kΩ/□). In a Raman spectroscopy of the graphene layer, the graphene layer had an obvious characteristic peak of 2650 cm$^{-1}$, and the graphene characteristic peak and a graphite characteristic peak (~1570 cm$^{-1}$) had an intensity ratio of less than 1.

Example 2-4

Similar to Example 1, the differences in Example 2-4 were the substrates being a pure copper substrate with an area of 15 cm×15 cm (commercially available from Nilaco Corporation, Japan), and the electron cyclotron resonance device being that of Taiwan Application No. 100101138. The deposited graphene layer with an area of 15 cm×15 cm was electrically tested to measure its sheet resistance (about 8 kΩ/□). In a Raman spectroscopy of the graphene layer, the graphene layer had an obvious characteristic peak of 2650 $cm^{-1}$, and the graphene characteristic peak and a graphite characteristic peak (~1570 $cm^{-1}$) had an intensity ratio of about 0.6.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A method of forming a single graphene layer wherein the width and length of the graphene layer are more than 1 cm, comprising:

putting a substrate in a chamber of an electron cyclotron resonance device for providing a magnetic field and evacuating the chamber;

conducting a carbon-containing gas into the chamber, wherein the carbon-containing gas has a pressure of $10^{-2}$ torr to $10^{-4}$ torr in the chamber;

heating the substrate until the substrate has a temperature of 100° C. to 400° C.; and using a microwave with an electron cyclotron resonance mechanism to excite the carbon-containing gas under the magnetic field to deposit the graphene layer on the substrate.

2. The method as claimed in claim 1, wherein the electron cyclotron resonance device comprises a single microwave source to provide the microwave.

3. The method as claimed in claim 2, wherein the graphene layer has an area of 1 cm×1 cm to 30 cm×30 cm.

4. The method as claimed in claim 1, wherein the electron cyclotron resonance device comprises dual or multi-microwave sources to provide the microwave.

5. The method as claimed in claim 1, wherein the carbon-containing gas is a hydrocarbon compound.

6. The method as claimed in claim 1, wherein the hydrocarbon compound comprises methane, ethene, ethyne, or combinations thereof.

7. The method as claimed in claim 1, further comprising conducting an inert gas and hydrogen into the chamber before, during, or after the step of depositing the graphene layer on the substrate, wherein the inert gas has a pressure of $10^{-2}$ torr to $10^{-4}$ torr in the chamber, and the hydrogen has a pressure of $10^{-2}$ torr to $10^{-4}$ torr in the chamber.

8. The method of claim 7, wherein the inert gas comprises argon, helium, or combinations thereof.

9. The method of claim 1, wherein the step of using the microwave with the electron cyclotron resonance mechanism to excite the carbon-containing gas forms a carbon-containing plasma with a density of $10^{10}$ ions/$cm^3$ to $10^{12}$ ions/$cm^3$.

10. The method of claim 1, further comprising forming a film on the substrate before the step of putting the substrate in the chamber of the electron cyclotron resonance device, wherein the film comprises silicon carbide.

11. The method of claim 1, wherein the step of using the microwave with the electron cyclotron resonance mechanism to excite the carbon-containing gas forms a carbon-containing plasma with a density of $10^{10}$ ions/$cm^3$ to $10^{12}$ ions/$cm^3$, wherein said method further comprising conducting an inert gas and hydrogen into the chamber before, during, or after the step of depositing the graphene layer on the substrate, wherein the inert gas has a pressure of $10^{-2}$ torr to $10^{-4}$ torr in the chamber, and the hydrogen has a pressure of $10^{-2}$ torr to $10^{-4}$ torr in the chamber.

\* \* \* \* \*